United States Patent [19]
Warner

[11] Patent Number: 5,377,650
[45] Date of Patent: Jan. 3, 1995

[54] LOW EMISSION ENGINES

[75] Inventor: Donald W. Warner, Cass City, Mich.

[73] Assignee: Walbro Corporation, Cass City, Mich.

[21] Appl. No.: 142,767

[22] Filed: Oct. 26, 1993

[51] Int. Cl.[6] ............................................. F02M 25/06
[52] U.S. Cl. ......................................... 123/568; 261/51; 60/290
[58] Field of Search ......................... 123/568; 261/51; 60/290, 293

[56] References Cited

U.S. PATENT DOCUMENTS

| | | | |
|---|---|---|---|
| 3,992,878 | 11/1976 | Moorman | 123/568 |
| 4,064,693 | 12/1977 | Shibata | 60/293 |
| 4,142,496 | 3/1979 | Saito et al. | 123/568 |
| 4,150,645 | 4/1979 | Berent | 123/699 |
| 4,165,611 | 8/1979 | Ishikawa | 60/293 |
| 4,169,439 | 10/1979 | Tsiang et al. | 123/699 |
| 4,201,165 | 5/1980 | Tanaka et al. | 123/568 |
| 4,257,227 | 3/1981 | Sato et al. | 60/293 |
| 4,349,005 | 9/1982 | Gotoh et al. | 123/571 |
| 4,372,277 | 2/1983 | Otobe et al. | 123/571 |
| 4,407,247 | 10/1983 | Masaki | 123/438 |
| 4,429,676 | 2/1984 | Gotoh et al. | 123/571 |
| 4,583,363 | 4/1986 | Urushidani et al. | 60/293 |
| 5,105,620 | 4/1992 | Matsumura | 60/293 |

Primary Examiner—David A. Okonsky
Attorney, Agent, or Firm—Barnes, Kisselle, Raisch, Choate, Whittemore & Hulbert

[57] ABSTRACT

A small engine emissions control system with a float bowl carburetor minimizing CO emissions by tailoring fuel delivery to engine demand over a broad range of operating speeds and conditions, an exhaust gas recirculation valve to reduce $NO_x$ emissions and a pulse valve mixing fresh air with hot exhaust gases to reduce HC and CO emissions.

25 Claims, 6 Drawing Sheets

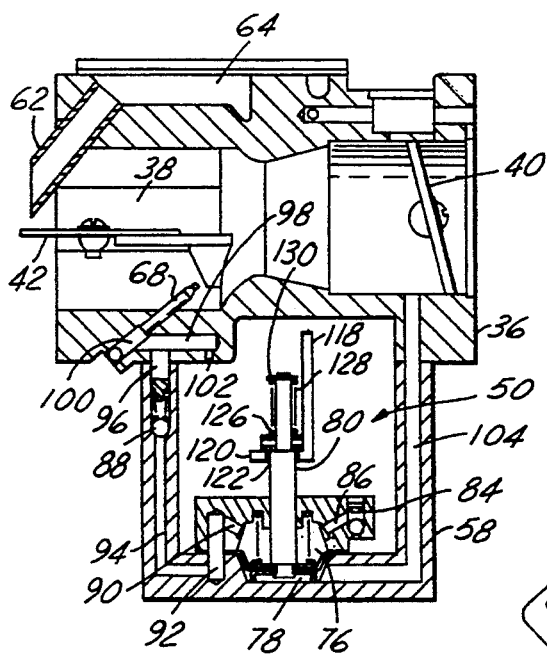
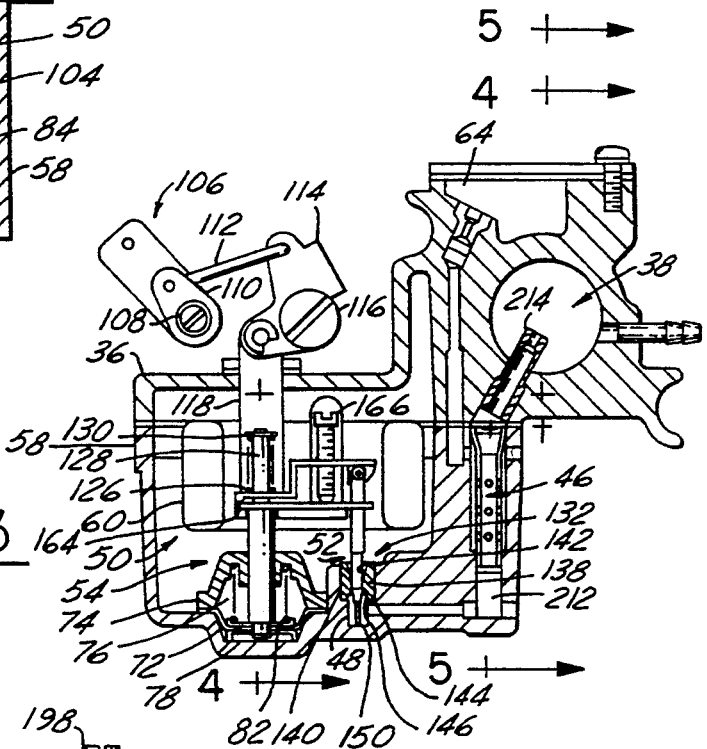
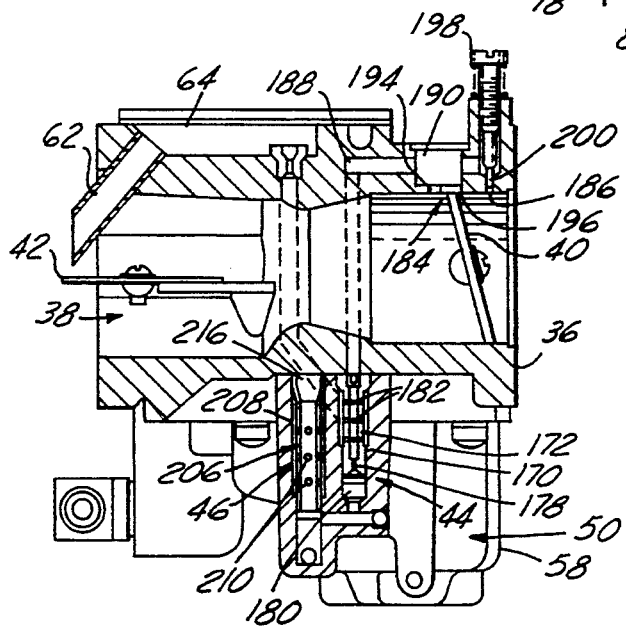

5,377,650

LOW EMISSION ENGINES

FIELD OF THE INVENTION

This invention relates to internal combustion engines, and more particularly to a carburetion system for supplying metered fuel and air to an engine and for regulating engine exhaust gas emissions.

BACKGROUND OF THE INVENTION

Currently, small displacement internal combustion engines for portable power tools such as lawn mowers, compressors and portable generators are not required to meet either state or federally mandated engine exhaust emissions standards as are automobile engines. Many of these small engines are found on handheld power tools. Usually, they are less than 60 bhp and have at most four cylinders, and typically only one or two cylinders. Unlike automotive engines, power tool engines are frequently run for extended durations at full throttle and idle.

The expected phase-in of stringent emissions standards for these small engines poses a difficult design problem. Unlike automobile engines, power tool engines are utilized to power less costly devices and the additional cost of adding an automobile type emissions control system would be prohibitive. Some early attempts at controlling automobile engine emissions utilized carburetors. However, the carburetors became extremely complex and gasoline fuel injection systems were developed instead. An automotive fuel injection system typically utilizes a computerized control system to regulate engine and exhaust emissions while monitoring engine parameters and emissions with electronic sensors.

It would not be feasible to apply modern automobile engine emission control systems to small engines because of the complexity and added cost. Additionally, no single automotive carburetion system would achieve the expected emissions requirements for power tool engines, and none would be capable of being tailored and adjusted for each of the various applications a particular small engine might require. With forthcoming emissions requirements being phased in for small engines, a need has arisen to design a small engine emissions control and fuel delivery system which meets expected standards, yet minimizes the complexity of emissions components and minimizes costs in a manner which will only marginally increase the overall cost of an engine using these devices. Since small engines are generally utilized on moderately priced items such as lawn mowers, chain saws, weed wackers, and generators, the cost of the emissions control system cannot significantly increase the current engine price or else the cost of the device to the consumer will rise to an unacceptable, and possibly non-competitive level in the marketplace, and the consumer will be forced to find an alternative.

SUMMARY OF THE INVENTION

To achieve expected legislatively mandated emissions standards, a small engine fuel and emissions system has a carburetor with an exhaust gas recirculation (EGR) valve and/or a fresh air pulse valve. $NO_x$ emissions are decreased by exhaust gas recirculation and HC and CO emissions are reduced by mixing fresh air with the exhaust gases. To further reduce CO emissions, the fuel is closely metered and controlled at full throttle, intermediate, and idle conditions by a float bowl carburetor having a metering rod for controlling delivery of fuel to a fuel well which supplies both an idle fuel and air emulsifier and a main fuel and air emulsifier. Preferably, the carburetor has a self-modulating choke and an accelerator pump disengagingly communicating with the metering rod and being fed fuel by a movable diaphragm. Exhaust gas is recirculated only when the small engine is operating under substantial loads and speeds and preferably only when warmed up. Preferably, the EGR valve is controlled by a ported vacuum signal, and includes a thermal cut-off valve to ensure the EGR valve operates only when the engine is warmed up. Preferably, the pulse air valve shuts off at engine idle or early-off idle, depending on its particular calibration. At higher engine speeds and open throttle positions, the pulse air valve draws fresh air into the exhaust gases in the exhaust system to provide oxygen which reacts with residual HC and CO to oxidize them into $CO_2$ and $H_2O$. Preferably, the fresh air inlet of the pulse air valve is located in the stream of air within an engine air cleaner to provide noise reduction and isolation of noise emanating from the pulse air valve and the engine exhaust gas system.

Objects, features and advantages of this invention are to provide a small engine emissions carburetor system which can be easily and readily designed for a specific small engine application and tailored to achieve desired and governmentally required emissions standards for exhaust gases, is compact and essentially self-contained in several components, is efficient and cost feasible for utilization on relatively low cost small engine devices, operates without utilization of a computerized control system and electronic sensors thereby negating the need for an on-board computerized monitoring and sensing system, has a long service life and is rugged, durable, reliable, of simplified design and of relatively economical manufacture and assembly.

BRIEF DESCRIPTION OF THE DRAWINGS

These and other objects, features and advantages of this invention will be apparent from the following detailed description, appended claims, and accompanying drawings in which:

FIG. 3 is a sectional end view of a carburetor of the invention as applied to a small engine;

FIG. 4 is a sectional side view taken generally on line 4—4 of FIG. 3;

FIG. 5 is a sectional side view taken generally on line 5—5 of FIG. 3;

DETAILED DESCRIPTION OF THE INVENTION

Figure 1:
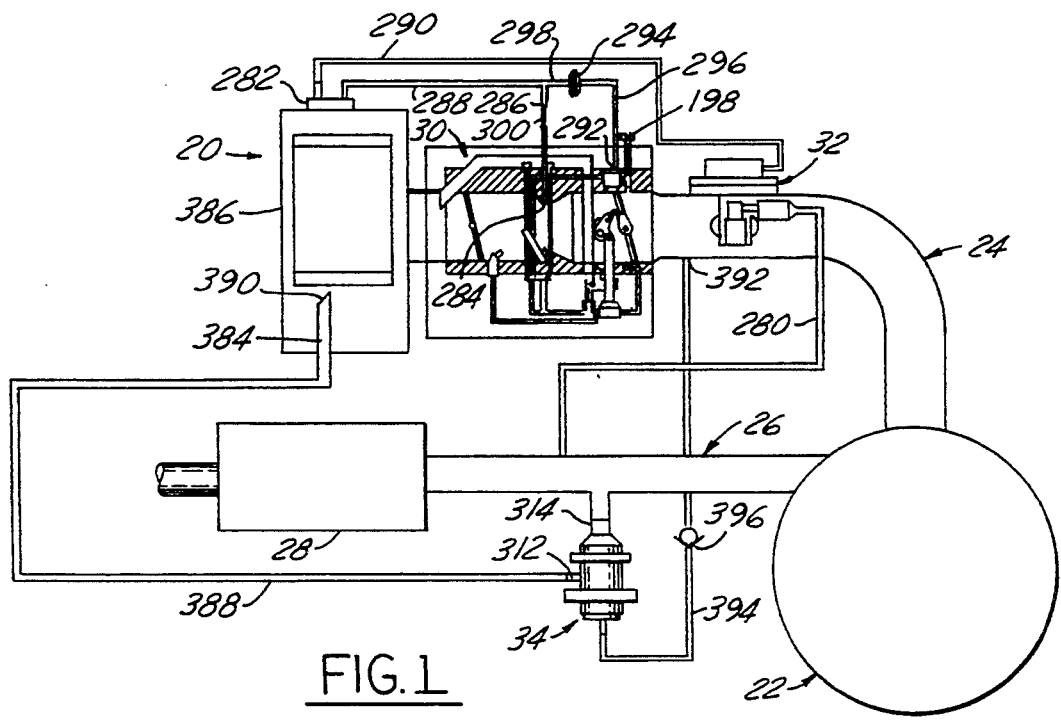
FIG. 1 is a semi-schematic view of a fuel metering and exhaust gas emissions system embodying this invention applied to a small engine.

Referring in more detail to the drawings, FIG. 1 semi-schematically illustrates a fuel metering and emissions control system 20 embodying this invention for a small engine 22. The engine 22 has one or two cylinders or variable volume work chambers each of which communicates through an inlet valve with an intake manifold 24 and through an outlet valve with an exhaust manifold 26, which is preferably connected to a muffler 28. The system 20 has a float bowl carburetor 30, an exhaust gas recirculation (EGR) valve 32 cooperating with the carburetor, and preferably a fresh air intake pulse valve 34 cooperating with the exhaust gas system.

In operation, the carburetor 30 supplies a fuel and air mixture through the intake manifold 24 to each engine chamber for ignition and combustion, and the resulting exhaust gases are discharged through the exhaust manifold 26 to the atmosphere. When the engine is operating under substantial load, a portion of the exhaust gases are recirculated through the intake manifold 24 downstream from the carburetor 30 by the EGR valve 32 to reduce $NO_x$ emissions. Atmospheric air is also discharged into the stream of hot exhaust gases by the pulse air valve 34 to reduce the HC and CO emissions. The emissions are further reduced by the carburetor 30 which tailors its fuel delivery to the engine fuel demand over a broad range of engine operating speeds and conditions.

Float Bowl Carburetor

The float bowl carburetor 30 delivers a regulated flow of atomized fuel and air to the engine 22 in a quantity and quality which controls CO emissions with little or no increase in HC emissions. As shown in FIGS. 2–5, the carburetor 30 has a body 36 with a fuel and air mixing passage 38 with a throttle valve 40 and a choke valve 42 therein. In operation, emulsified fuel is discharged into the passage through an idle system 44 and a main system 46 from a common fuel well 48. The quantity of liquid fuel supplied to the well 48 from a float bowl assembly 50 is varied and controlled as a function of the extent of opening of the throttle valve 40 by a metering assembly 52. Preferably, upon initial opening of the throttle 40, additional fuel is supplied for accelerating the engine by an accelerator pump assembly 54.

A substantially constant fuel level 56 is maintained in the float bowl assembly 50 of carburetor 30 to provide a steady flow of fuel to the metering assembly 52 and the accelerator pump 54. A float bowl housing 58 is attached to the body 36 of carburetor 30 and carries the metering assembly 52 and accelerator pump assembly 54 in the bowl beneath the fuel level 56. To maintain a constant fuel pressure or level, a float 60 is carried in the bowl 58 and opens and closes a needle valve (not shown) which controls the admission of liquid into the float bowl 58. The float bowl 58 is vented to the atmosphere through a tube 62, closed pocket 64 and passage 66.

Accelerator Pump Assembly

Figure 2:
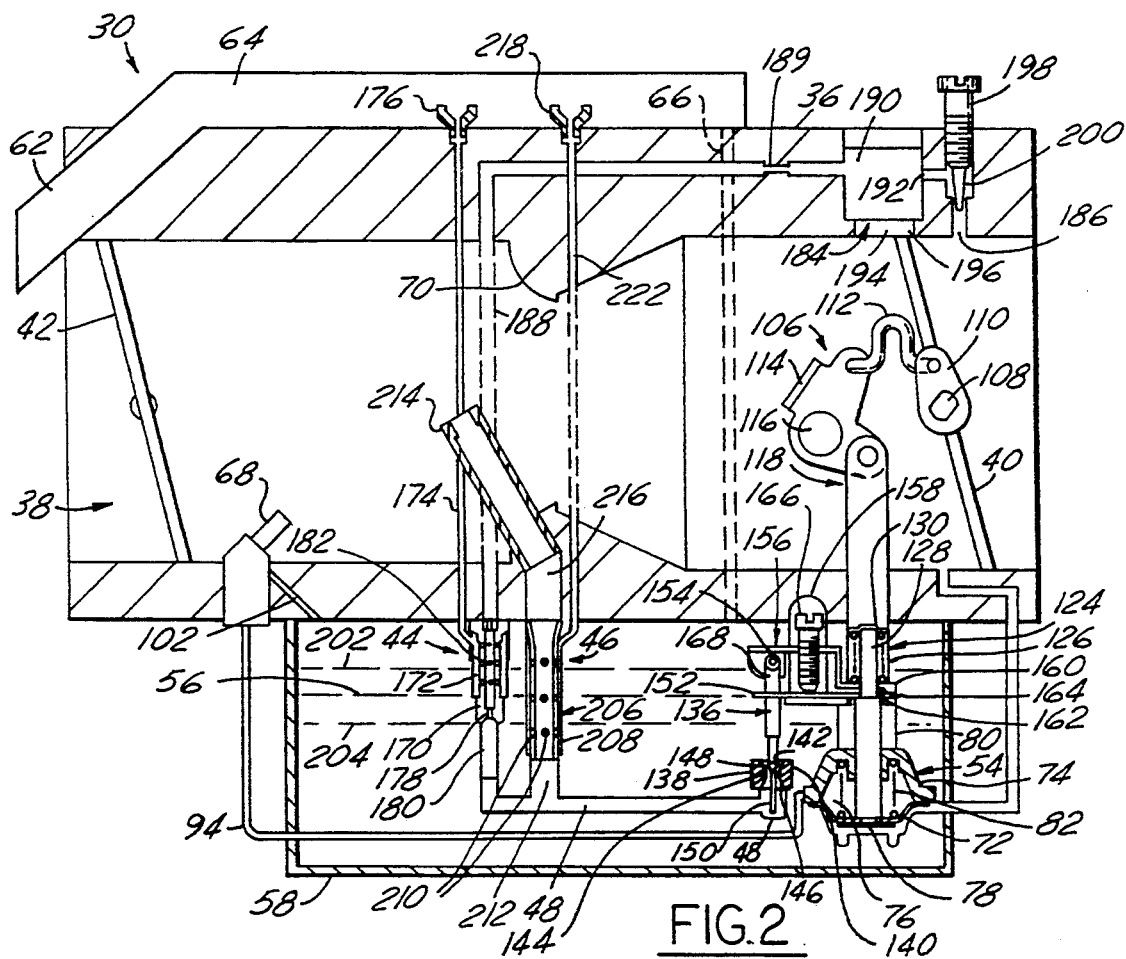
FIG. 2 is a semi-schematic view of a carburetor of the system of FIG. 1.

Upon the rapid opening of the throttle 40, the accelerator pump 54 delivers a metered quantity or burst of liquid fuel to a jet 68 disposed in the mixing passage 38 upstream of a venturi 70. As shown in FIGS. 2–4, the pump 54 has a diaphragm 72 received in a housing 74 in the float bowl 58 and defining upper and lower chambers 76 and 78 therein. An actuator rod 80 is slidably received in the housing 74 and connected to the diaphragm 72 which is yieldably biased to its retracted position by a compression spring 82 received in the housing 74. Liquid fuel is supplied from the bowl 58 to the upper chamber 76 through a one-way inlet check valve 84 and passage 86 and is discharged to the jet 68 through a one-way outlet check valve 88 and connecting passageways 90, 92, 94, 96, 98 and 100. Preferably downstream of the outlet check valve 88, the passage has a small bleed port 102. To facilitate movement of the diaphragm 72, the lower chamber 78 is bled to the atmosphere through passage 104 opening into the mixing passage 38 upstream of the throttle valve 40.

In use, the pump assembly 54 is actuated by opening of the throttle through a mechanical linkage 106 in which the throttle valve 40 is secured to a cross shaft 108 connected to one end of a lever arm 110. The other end of the arm 110 is pivotally connected by a wire link 112 to one end of a crank arm 114 pivoted on a pintle 116 and pivotally connected adjacent its other end to one end of a bracket 118. The bracket 118 has a right angle tab 120 with a hole 122 through which the actuator rod 80 is slidably received. The bracket 118 is connected to the rod 80 through a lost motion coupling 124 having a spring 126 received over a reduced diameter shank 128 of the rod 80 and retained thereon by a clip 130.

In operation, as the throttle 40 is initially opened from its fully closed position, the linkage 106 moves the actuator rod 80 and its diaphragm 72 generally vertically upward to discharge fuel from the upper chamber 76 and into the mixing passage 38 through the jet 68. After the diaphragm has moved to its fully raised position, the lost motion mechanism 124 allows the throttle 40 to be further opened. As the throttle 40 closes, the compression spring 82 returns the diaphragm 72 to its fully lowered position which draws additional liquid fuel into the upper chamber 76 of the pump from which it is discharged by the next stroke of the diaphragm 72 as the throttle 40 is again opened from its closed position. The actuation of the accelerator pump 54 to deliver a suitable quantity of fuel at a desired rate can be varied by adjusting the size of the pump jet 68, pump stroke, bumper spring 126 and/or bleed off port 102.

Fuel Metering Assembly

The quantity and rate at which liquid fuel supplied to the well 48 for the idle and main systems 44, 46 is varied and controlled by the metering assembly 52 which has a variable area metering valve 132 with an axially movable metering rod 136 received in an annular orifice 138 through which liquid fuel flows from the float bowl 58 into the well 48. In FIG. 3, the orifice 138 is received in a counterbore 140 in the float bowl 58 and has a tapered inlet portion 142 merging into a throat opening 144 through a reverse taper 146 into the well 48. In FIG. 2, the metering rod 136 has frusto-conical valve portion 148 received in the orifice 138 and a tied 150 with reduced diameter which projects through the orifice 138 and can bear on the bottom of the well 48 to limit the extent to which the valve can be moved axially into the orifice 138.

The metering rod 136 is adjustably carried by the bracket 118 for axial movement by opening and closing of the throttle 40. The rod 136 is slidably received through a hole in a guide plate 152 received on the bracket shelf tab 120 and pivotally connected by a pin 154 to a carrier bracket 156 slidably received between a pair of spaced apart upstanding guide tabs 158 of the shelf bracket. The carrier bracket 156 has an offset leg 160 with a through hole 162 slidably received over the rod shank 128 and a downturned end 164 which pivotally bears on the guide plate 152. The position of the carrier bracket 156 can be adjusted by a machine screw 166 threaded through it and bearing on the guide plate 152. The quantity of fuel flowing through the orifice 138 can be adjusted or trimmed by the adjusting screw 166. This adjustment improves the performance of the carburetor 30 by narrowing the partial throttle flow bands or flow rates which can be achieved with the carburetor. Preferably, to minimize the tendency of the metering rod 136 to vibrate in the annular orifice 138, it is yieldably biased into engagement with one side of the orifice by a spring 168 received on the pivot pin 154 of the carrier bracket 156. This prevents fluctuations of fuel flow through the orifice 138 and minimizes the tendency of any vibration to damage the rod 136 and/or orifice 138.

Idle Emulsion System

To insure reduced engine emissions under idle and low load conditions, the idle system 44 supplies an emulsified fuel and air mixture to the mixing passage 38. The system has an emulsion tube 170 received in a counterbore in the body 36 defining an annular chamber 172 to which air is supplied by a passage 174 communicating with the air chamber 64 through a bleed orifice 176. The tube 170 has a restricted inlet 178 which receives liquid fuel from the well 48 through a passage 180, and a plurality of circumferentially and axially spaced apart ports 182 through which air passes to emulsify fuel in the tube 170.

The emulsified fuel is supplied to both an idle progression slot 184 and a trim port 186 opening into the mixing passage 38 through a passage 188, calibration restrictor 189, reservoir chamber 190 and a passageway 192. Preferably, the progression slot 184 is axially elongate and overlaps the throttle plate 40 when closed so that it has portions 194 & 196 upstream and downstream thereof. The quantity of emulsified fuel discharged through the trim port 186 can be varied and adjusted by a needle valve 198 threaded into the body and having a tapered frusto conical tip 200 which can be advanced into the trim port 186 to reduce its effective cross sectional area.

When the engine is cranked and initially starts, most of the ports 182 in the emulsion tube 170 are submerged in liquid fuel to a level indicated by the broken line 202 which initially provides a relatively richer emulsified fuel to the idle progression slot 184 and trim port 186. As the engine initially starts and speeds up to a no load high idle operating condition, the level of liquid fuel in the chamber 172 drops (as indicated by the broken line 204) so that air passes through more of the ports of the tube 170 which provides a somewhat leaner and more emulsified air and fuel mixture to the idle slot 184 and trim port 186. As the engine idles with the throttle closed, the partial vacuum produced by the engine on the downstream side of the throttle valve 40 draws emulsified fuel from the tube 170 through the downstream portion 196 of the progression slot 184 and the trim port 186. Air also flows through the upstream portion 194 of the slot 184 to further emulsify the fuel discharged through the downstream portion 196. As the throttle is initially opened, its upper edge sweeps across the progression slot 184 which changes the ratio of the effective size of the upstream portion 194 to the downstream portion 196 and thereby increases the quantity of emulsified fuel delivered to the engine as the throttle 40 is initially opened. Conversely, as the throttle 40 initially approaches its fully closed position, the changing of this ratio of the upstream to downstream portion decreases the quantity of fuel supplied to the engine under the idle no load condition. As the throttle is initially opened, it actuates through the mechanical linkage 106, both the fuel metering system 52 to supply more fuel to the well 48 and hence the idle emulsion system 44, and the accelerator pump 54 to directly supply additional fuel to the mixing passage 38 to accelerate the engine 22. Normally, the needle valve 198 and trim port 186 are adjusted to achieve a smooth running engine 22 at no load low idle conditions. A typical one or two cylinder small engine runs at about 800 to 1,800 rpm under low idle conditions and about 3,000 to 3,600 rpm under high idle conditions.

Main Emulsion System

To reduce engine emissions and improve fuel economy under engine load operating conditions, the main fuel system 46 supplies an emulsified fuel and air mixture to the mixing passage 38. The system has an emulsifying tube 206 received in a counterbore in the body defining an annular chamber 208 from which air is drawn through a plurality of circumferentially and axially spaced ports 210 to emulsify liquid fuel supplied to the lower end of the tube 206 from the well 48 through a passage 212. The emulsified fuel is supplied to a nozzle 214 received in the mixing passage adjacent the venturi 70 through an interconnecting passage 216 in the body. Air is supplied to the chamber 208 from the pocket 64 through an air bleed orifice 218 and an interconnecting passage 222.

Typically, at engine startup, with the choke 42 open the venturi 70 does not produce any significant vacuum because the throttle 40 is closed and hence relatively little if any fuel is supplied to the mixing passage 38 by the main fuel system 46. At startup, usually most of the ports 210 of the emulsifier tube 206 are submerged in liquid fuel to the level of broken line 202 and hence, as the throttle 40 is initially opened, the vacuum produced by the venturi 70 draws a relatively richer initial charge of emulsified fuel through the nozzle 214 and into the mixing passage 38. As the engine 22 runs with the throttle open, the liquid fuel is drawn from the chamber 208 so that air is supplied through all the ports 210 to emulsify fuel in the tube 206 drawn from the well 48 and to supply the emulsified fuel to the mixing chamber 38 through the nozzle 214. When the throttle 40 is substantially open, relatively little if any fuel is supplied to the mixing chamber 38 by the idle system 44.

Initial opening of the throttle 40 also actuates the accelerator pump 54 to supply additional fuel through the nozzle 68 for accelerating the engine 22 to a higher operating speed. Opening of the throttle 40 also actuates the fuel metering system 52 by moving the metering rod 136 axially away from annular orifice 138 to supply more liquid fuel to the well 48 for emulsification and discharge into the mixing passage 38 by the main fuel system 46. As fuel is drawn from the well 48, the float 60 opens and closes the needle valve (not shown) communicating with the fuel supply to maintain a substantially constant level of fuel as indicated by the broken lines 56 and hence a relatively constant fuel pressure in the bowl 58.

Exhaust Gas Recirculation Valve

As shown in FIG. 1, to control $NO_x$ emissions under engine load operating conditions, the exhaust gas recirculation valve 32 opens and introduces and meters a quantity of exhaust gas from the exhaust manifold 26 into the intake manifold 24. Preferably, under cold start and engine idle conditions, the EGR valve 32 is closed to avoid degradation of engine performance at low engine speeds and loads and cold operating conditions.

Figure 6:
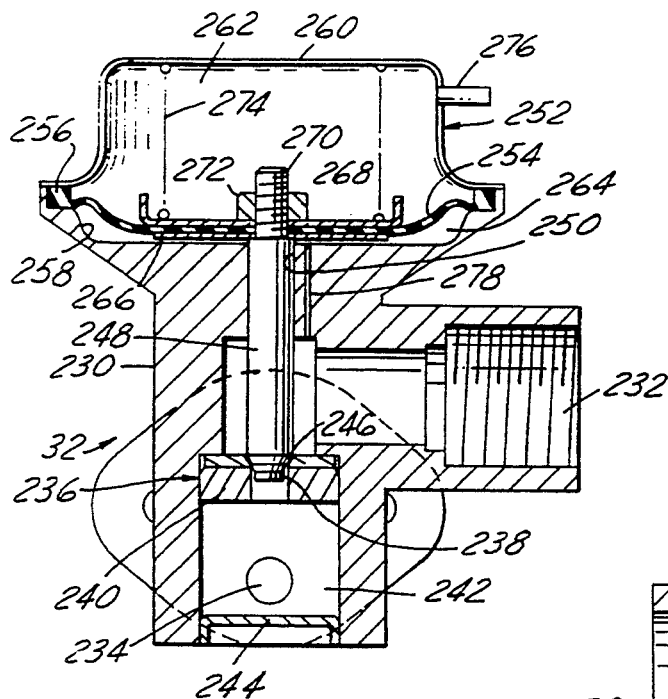
FIG. 6 is a sectional side view of an exhaust gas recirculation valve as utilized in FIG. 1.

As shown in FIG. 6, the valve 32 has a body 230 with an inlet passage 232 communicating with an outlet passage 234 through a valve assembly 236. The valve has a seat 238 in a ring 240 press fit and sealed in a bore 242 in the body 230, the open end of which is closed and sealed by a cap 244 press fit therein. A complementary frusto-conical valve 246 is formed at the free end of an actuator rod 248 slidably received for reciprocation in a bore 250 through the body 230. The valve 32 is actuated to open and closed positions by a diaphragm assembly 252 with a flexible diaphragm 254 having a peripheral rib 256 which is received and sealed between a pocket 258 in the body 230 and an overlying cover 260 to form upper and lower chambers 262 & 264 on opposite sides of the diaphragm 254. The central portion of the diaphragm 254 is received between a backing plate 266 and a spring retainer plate 268 which are received over a reduced diameter threaded shank 270 of the actuator rod and secured to it by a nut 272. The valve 32 is yieldably biased to its closed position by a compression spring 274 received between the cover 260 and retainer plate 268 and is yieldably urged towards its open position by applying vacuum to the upper chamber 262 through a port 276. Preferably, to decrease the force required to open the valve, the pressurized exhaust gases are admitted to chamber 264 through a passage 278 to act on the lower face of the diaphragm 254. If desired, an enlarged bore 250 can be used in conjunction with or in lieu of passage 278 to communicate the exhaust gases with the lower face of the diaphragm 254.

The EGR valve 32 is installed in the system of FIG. 1 with its inlet 232 communicating with the engine exhaust manifold 26 through a conduit 280 and its outlet 234 communicating with the engine intake manifold 24 downstream of the carburetor throttle valve 40.

Opening and closing of the EGR valve 32 is controlled by a partial vacuum produced by the venturi 70 of the carburetor 30. Opening of the EGR valve 32 is prohibited at cold ambient engine temperatures by a temperature responsive control valve 282 which opens only above a predetermined temperature which is usually in the range of 55° F. to 75° F. A venturi tap 284 is connected to the EGR diaphragm assembly through the temperature responsive valve 282 by suitable conduits or tubes 286, 288 & 290.

In a small displacement, one or two cylinder engine 22, the vacuum signal at the tap 284 is usually of insufficient magnitude to adequately control EGR valve operation. Hence, manifold vacuum is also utilized by connecting a tap or port 292 in the mixing passage 38 upstream of the throttle plate 40 through a one-way check valve 294 in series with the venturi tap 284 through suitable conduits 296 & 298. The check valve 294 closes on positive manifold pressure pulses and opens only on the negative manifold pressure pulses so that only the negative manifold pressure pulses are applied to the diaphragm assembly 252 of EGR valve 32 to open it. To prevent the one-way check valve 294 from trapping vacuum in the line 298, it bleeds off through a very small venturi restrictor 300 in the vacuum line 286 of the venturi tap 284. At higher carburetor air flow rates, such as under wide open throttle conditions, this venturi tap 284 also increases the magnitude of the vacuum applied to the EGR valve 32. Since the exhaust gas pressure also increases with engine speed and load, its assistance in opening the EGR valve increases with increasing engine speed and load.

Figure 7:
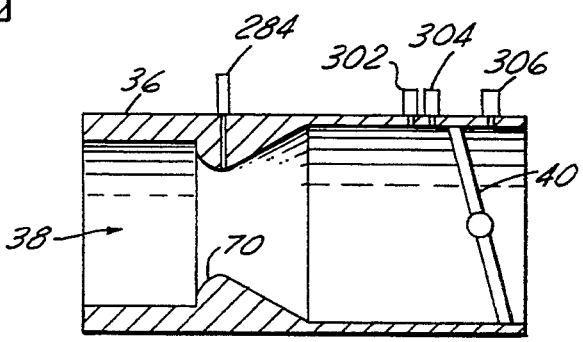
FIG. 7 is a schematic sectional side view of a carburetor passage showing various alternative ported signals depicted thereon.
Figure 8:
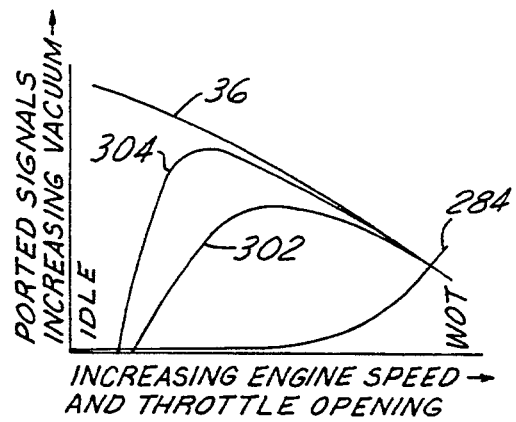
FIG. 8 is a graph of the characteristics of the various ported vacuum signals of FIG. 7 as a function of engine speed.

The engine operating speed at which the vacuum signal begins to open the EGR valve and the extent to which it opens can be varied and adjusted within limits by changing the location of the tap in the carburetor mixing passage 38 from which the vacuum signal is obtained. FIG. 8 diagrammatically illustrates the vacuum signal as a function of increasing engine speed of a typical one or two cylinder engine for the four port positions (FIG. 7) in the mixing chamber of venturi port 284, upstream throttle ports 302 and 304 and downstream throttle or manifold port 306. By utilizing one or a combination of these ports, an appropriate vacuum response signal can be obtained for the EGR valve 32 to suitably match the timing and extent of exhaust gas recirculation with engine operating conditions which will accept exhaust gas recirculation without substantially deteriorating engine performance and power output. For a typical small displacement one or two cylinder engine, there should be no exhaust gas recirculation during engine start-up, no load idling and cold engine operating conditions and increasing exhaust gas recirculation under hot engine high speed and full load operating conditions.

Pulse Air Valve

To reduce emissions, the pulse air valve 34 introduces fresh air into the engine exhaust manifold 26 which provides oxygen which reacts with HC and CO exhaust gases to oxidize them into $CO_2$ and $H_2O$. Preferably, fresh air is introduced into the upstream end of the exhaust manifold 26 to increase the residence time in which the fresh air is in contact with the hot exhaust gases (greater than 1250° F.) to maximize the reaction time. To minimize engine backfiring, preferably the valve 34 is closed during rapid deceleration, idling and low speed operating conditions.

Figure 9:
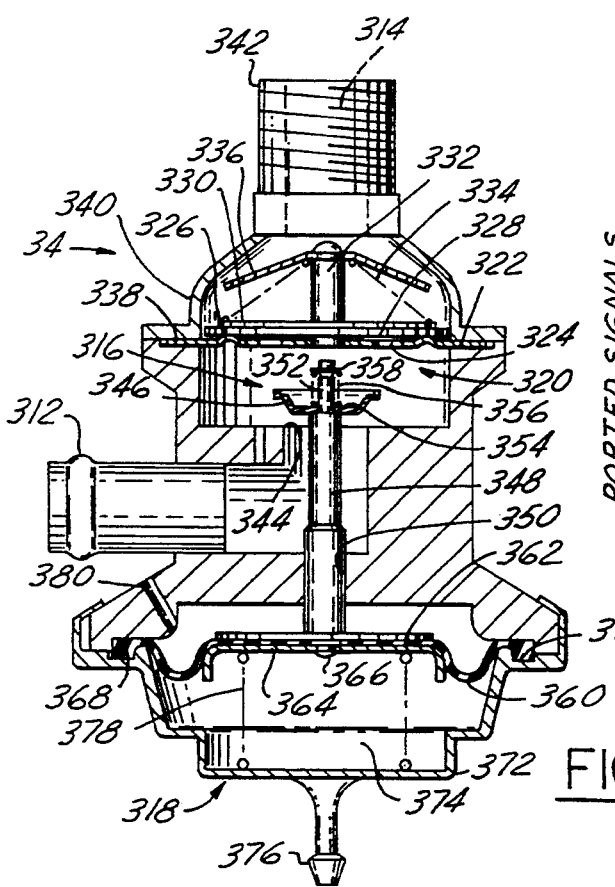
FIG. 9 is a sectional side view of a modulated pulse air valve as utilized in FIG. 1.

As shown in FIG. 9, the valve 34 has a body 310 with a fresh air inlet passage 312 communicating with a fresh air outlet passage 314 through a control valve 316 actuated by a diaphragm assembly 318 and a one-way check valve assembly 320. The check valve 320 permits negative or subatmospheric exhaust gas pulses to draw fresh air through the assembly and into the exhaust manifold 26 and the positive or superatmospheric exhaust gas pulses to close the check valve 320 to prevent backflow of exhaust gases through the pulse valve 34. The check valve 320 has a carrier plate 322 with through holes 324 encircled by a circumferentially continuous valve seat 326 and a confronting valve disc 328 with a backing plate 330 both slidably received on a guide shaft 332 and yieldably urged toward the valve seat 326 by a helical compression spring 334. A spring retainer washer and baffle plate 336 is staked to one end of the shaft 332 and its other end is fixed to the carrier plate 322. The carrier plate 322 is received in a counterbore 338 in the body 310 and retained therein by an overlying cap 340 with a threaded nipple 342 through which the outlet passage 314 extends.

The control valve assembly 316 has a valve seat 344 in the body and a complementary mating disc valve 346 carried by an actuator rod 348 journalled for axial reciprocation in a bore 350 in the body by the diaphragm assembly 318. The valve disc 346 is slidably received on a reduced shank portion 352 of the actuator rod 348 and yieldably urged into engagement with the shoulder 354 by a compression spring 356 received over the shank and retained thereon by a snap washer 358. The actuator assembly has a flexible diaphragm 360 received between a backing disc 362 and spring retainer 364 which are secured by staking at 366 to the other end of the actuator rod 348 for movement therewith. The outer edge 368 of the diaphragm 360 is received and sealed between a groove 370 in the body and a cover 372 thereby defining a vacuum chamber 374 communicating with a port 376. The valve is yieldably urged to its open position by a compression spring 378 received in the chamber 374 between the retainer 364 and the cover 372. The other side of the diaphgram 360 communicates with the atmosphere through a bleed port 380. To avoid a pressure lockup of the valve 316 under certain operating conditions, a bleed port 382 is also provided between the air inlet passage 312 and the check valve 320. This bleed port 382 can also be calibrated to admit some air into the exhaust gases when the valve 316 is closed but not a sufficient quantity to cause engine backfiring.

When the pulse air valve 34 is installed in the system, the fresh air outlet 314 is connected to the exhaust manifold 26 preferably adjacent its upstream end. Preferably to reduce operating noise, the air intake passage 312 is connected to an intake nozzle 384 disposed in an air cleaner 386 for the carburetor through a conduit 388. Preferably, the intake nozzle 384 has a beveled end 390 disposed in the path of air flowing through the cleaner 386 to provide a ram effect forcing more fresh air into the pulse air valve 34. The port 376 for the diaphragm actuator assembly 318 is connected to an intake manifold tap 392 downstream of the throttle valve 40 by a conduit 394 and preferably has a one way check valve 396 therein to reduce pulsations.

Under engine deceleration, idle and early off idle operating conditions, a relatively high engine manifold vacuum is produced since the throttle 40 is nearly or completely closed, which acts on the actuator diaphragm 360 to close the pulse air valve 34 so that no fresh air is admitted through the valve 34. If fresh air were admitted under these operating conditions, it would cause the engine 22 to backfire. As the throttle 40 is opened and the engine 22 operates under load, the manifold vacuum at the tap 392 decreases significantly which causes the spring 378 to move the diaphgram 360 to open the control valve 316 so that fresh air is admitted to the check valve 320. The negative and positive pressure pulses of the exhaust gas actuate the one-way check valve 320 to draw fresh air through the check valve and into the exhaust manifold 26 on the negative pulses and to close the check valve 320 and prevent backflow of exhaust gases on the positive pulses. When the exhaust gases are at a temperature greater than about 1250° F., oxygen in the fresh air reacts with the CO and HC to form $CO_2$ and $H_2O$ thereby reducing the CO and HC exhaust gas emissions.

Modified Accelerator and Metering Assembly

Figure 10:
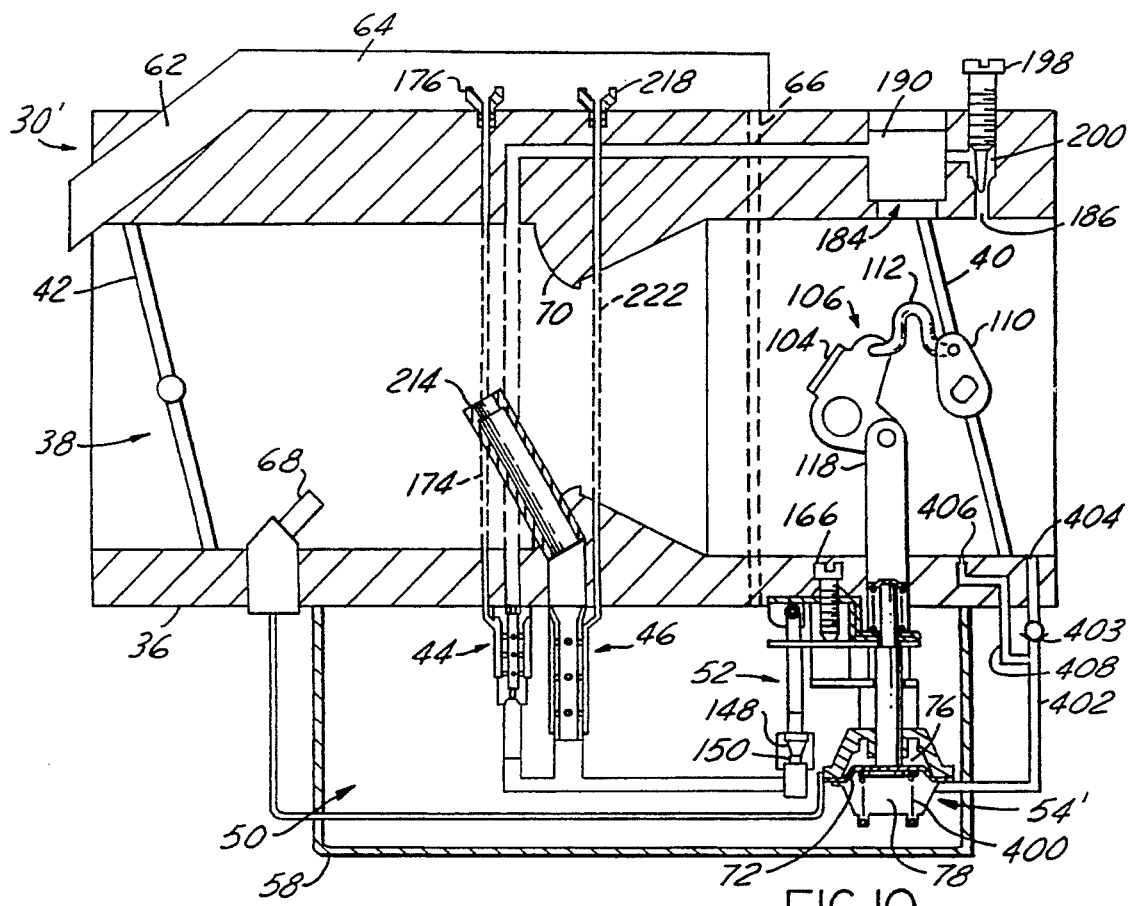
FIG. 10 is a semi-schematic side view of a modified carburetor.

FIG. 10 illustrates a carburetor 30' in which the metering assembly 52 and accelerator pump 54 are also vacuum actuated. Preferably, this modified carburetor 30' is used with larger displacement multi-cylinder engines in which the carburetor ported vacuum signals are smoother and more consistent. For smaller displacement, one and two cylinder engines, which produce rapidly varying ported signals due to engine cylinder pulsations, valve timing, pressure relief, etc., the completely only mechanically actuated system of carburetor 30 is preferred.

As shown in FIG. 10, the diaphragm 72 of the accelerator pump 54' is yieldably biased to its raised position by a compression spring 400 received in the lower chamber 78 which is connected by a passage 402 through a one way check valve 403 to a port 404 in the mixing passage 38 immediately downstream of the throttle valve 40 when closed. To reduce the amplitude of the pulsations of the engine manifold vacuum and thereby provide a steadier vacuum signal to the accelerator diaphragm 72, a restricted bleed port 406, immediately upstream of the closed throttle valve 40, communicates through a passage 408 with the passage 402 upstreram of the check valve 403. When the engine is stopped this bleed port also relieves the vacuum in the chamber 78.

In use, when the engine 22 is not running and the throttle 40 is closed, the accelerator pump 54 and metering rod assembly 52 are in the position shown in FIG. 10 in which the metering assembly 52 is open and fuel has been discharged from the accelerator pump upper chamber 76. With the throttle closed upon cranking of the engine, starting and running under idle conditions, the relatively high manifold vacuum produced at the tap 404 will cause the diaphgram 72 to move to its lowered position against the bias of the spring 400 thereby drawing liquid fuel into the upper chamber 76 to prime the accelerator pump 54. Upon initial opening of the throttle (to accelerate the engine), as its lower edge passes by the tap 404 there will be a substantial decrease in the vacuum acting on the diaphgram 72 and the spring 400 will move it upwardly to a position shown in FIG. 10, thereby discharging fuel from the upper chamber 76 through the jet 68 and into the mixing passage 38 to accelerate the engine 22.

With the throttle 40 open beyond the early-off idle position, the metering rod assembly 52 will be actuated by the mechanical linkage 106 in response to movement of the throttle. Whenever the throttle closes with the engine operating, the vacuum at the tap 404 will again cause the diaphragm 72 to move downwardly against the bias of the spring 400 and draw additional fuel into the upper chamber 76 thereby priming the accelerator pump 54. If starting the engine 22 with the choke 42 closed, then regardless of the throttle position, the manifold vacuum at the tap 404 will actuate the diaphgram 72 to draw fuel into the upper chamber 76 to prime the accelerator pump 54.

With this combined mechanical and vacuum actuation, the operation and cycling of both the metering valve 52 and the accelerator pump 54 can be better controlled and adjusted or tailored to meet the engine fuel demand under start up, idle running, and engine acceleration conditions.

Modified System

Figure 11:
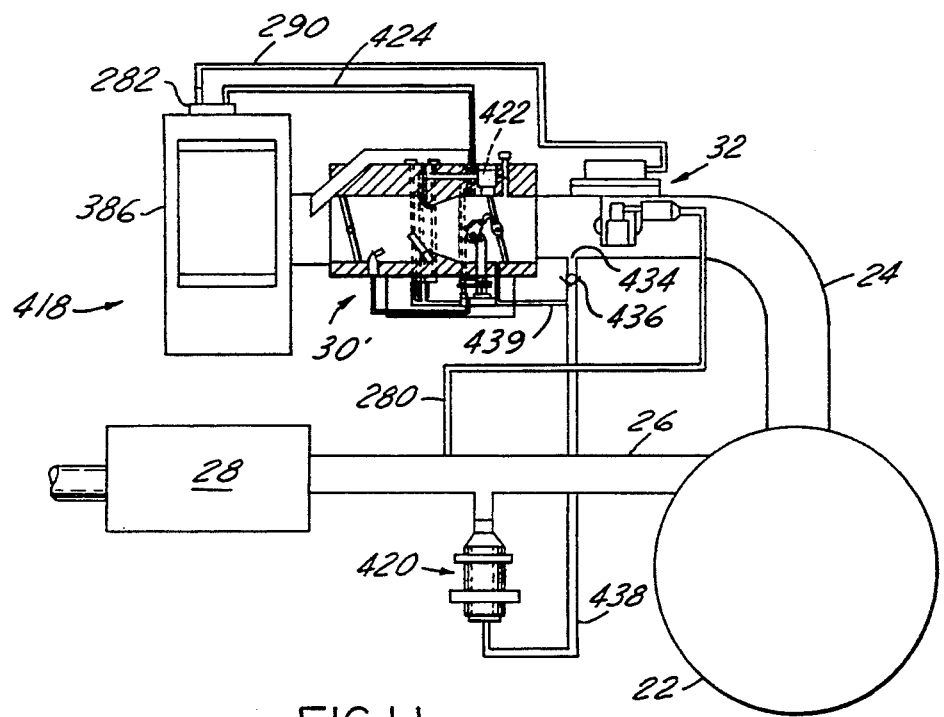
FIG. 11 is a semi-schematic side view of a first modification of a fuel metering and exhaust gas emissions system embodying this invention.

FIG. 11 illustrates a modified system 418 for a larger displacement multiple cylinder engine with a carburetor 30', modified pulse air valve 420 and vacuum signal for actuating the EGR valve 32. Larger displacement multiple cylinder engines usually produce a stronger and more stable carburetor mixing passage vacuum signal which permits use of a simplified vacuum porting arrangement for actuating the EGR valve 32. As shown in FIG. 11, a suitable vacuum signal for actuating the EGR valve 32 can be obtained directly from a tap 422 upstream of the closed throttle valve 40 which is connected directly to the temperature responsive valve 282 by a conduit 424. This eliminates the check valve 294, restricted orifice 300, venturi tap 284 and related plumbing of the system 20 of FIG. 1.

Figure 12:
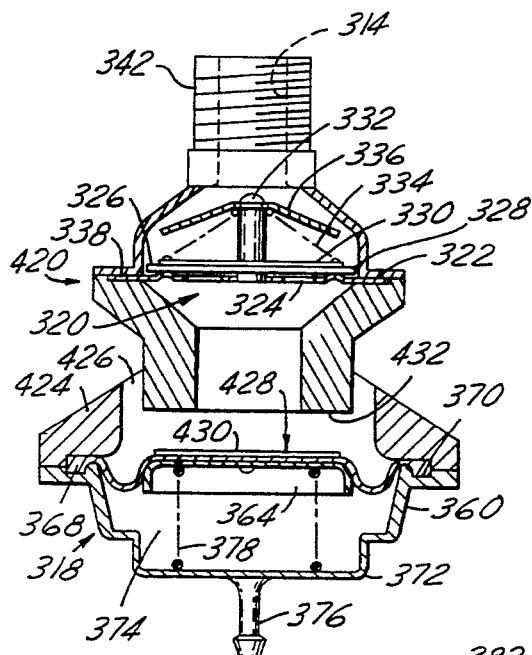
FIG. 12 is a sectional side view of an alternative modulated pulse air valve utilizing a ported vacuum signal of the modified system of FIG. 11.

As shown in FIG. 12, the modified pulse air valve 420 has a body 424 with a plurality of circumferentially spaced apart fresh air intake passages 426 which communicate directly with the atmosphere and the check valve assembly 320 through a control valve assembly 428. The control valve assembly has a valve disc 430 yieldably urged into sealing engagement with a seat 432 by a compression spring 378 and moved to its open position by a vacuum actuated diaphragm 360 of the actuator assembly 318. The passage 376 of the diaphragm actuator assembly is connected to an intake manifold port 434 through a one way check valve 436 by a suitable conduit 438. To provide a bleed to relieve vacuum in the diaphragm assembly 318 when the engine is shut off, conduit 438 is also connected by a restricted passage 439 to the port 406 in the carburetor mixing passage.

To avoid backfiring of the engine 22 under starting, idle, early off idle and deceleration operating conditions, no fresh air is admitted through the pulse air valve 420 to the exhaust manifold 26 which, if admitted, would cause backfiring under these conditions. Under these conditions, the control valve 428 is closed by the bias of the spring 378 and the vacuum acting on the diaphragm produced by negative manifold pressure pulses is insufficient to overcome the bias of the spring. As the engine operates under load, the negative intake manifold pressure pulses produce a sufficient vacuum acting on the diaphragm 360 to overcome the bias of the spring 378 and open the control valve 428 to admit fresh air into the exhaust gas manifold 26 to reduce the CO and HC exhaust gas emissions. In operation, the check valve 436 closes to prevent application of the positive intake manifold pressure pulses to the diaphragm actuator 318 and opens to apply only the negative manifold pressure pulses thereto. When the engine is shut off, the vacuum actuator assembly 318 is bled to the atmosphere through the restricted passage 439 and the port 406 in the carburetor mixing passage.

System with Modified Pulse Air Valve

Figure 13:
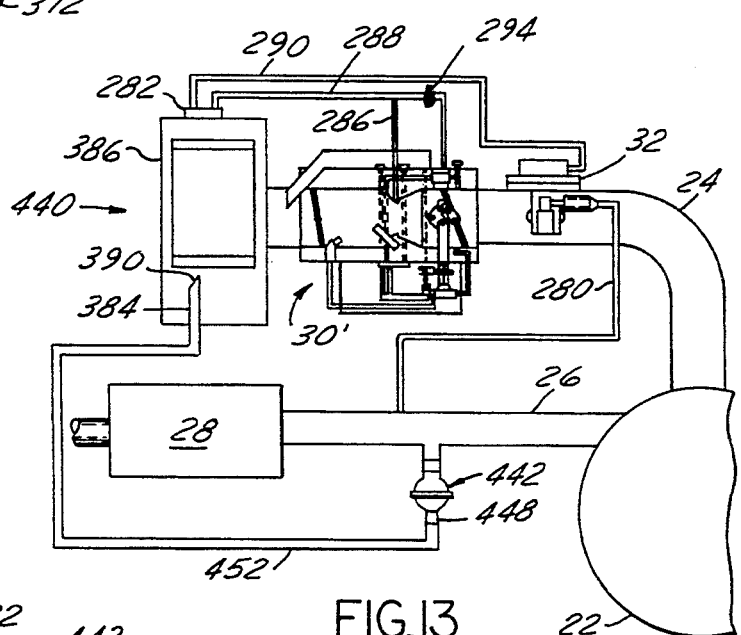
FIG. 13 is a semi-schematic side view of a second modification of a fuel metering and exhaust gas emissions system embodying this invention.

FIG. 13 illustrates a system 440 with a modified pulse air valve 442 which is suitable for engines which, during the deceleration mode, do not backfire when fresh air is being bled into the exhaust manifold to reduce CO and HC emissions. The pulse air valve 442 does not have any control valve and vacuum actuator and hence provides a simpler system with fewer parts which is more economical to manufacture and assemble and easier to maintain and service.

Figure 14:
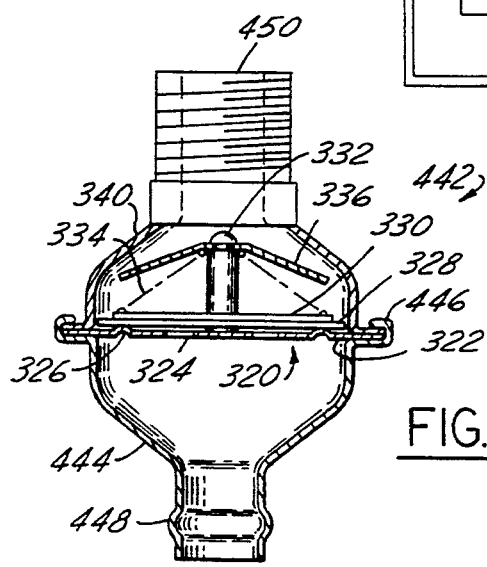
FIG. 14 is a sectional side view of a non-modulated pulse air valve of the system of FIG. 13.

As shown in FIG. 14, pulse air valve 442 has a sheet metal body 444 on which the upper housing 340 and the carrier plate 322 of the check valve assembly 320 are received and secured by a circumferentially continuous hem 446. The body 444 has an inlet 448 through which fresh air is supplied to the check valve 320.

As shown in FIG. 13, when the pulse air valve 442 is installed in the system 440, its outlet 450 is connected to the exhaust gas manifold 26 and its inlet 448 connected through a suitable conduit 452 to the fresh air inlet nozzle 384 disposed in the air cleaner 386.

Under all engine operating conditions, the pulse air valve 442 supplies fresh air to the exhaust manifold 26 in response to actuation of the check valve assembly 320 by negative exhaust gas pressure pulses which open the check valve 320 to draw fresh air into the manifold 26 and positive exhaust gas pressure pulses which close the check valve 320 to prevent backflow of exhaust gases through the pulse air valve 442.

System with Modified Pulse Air Valve and EGR Control

Figure 15:
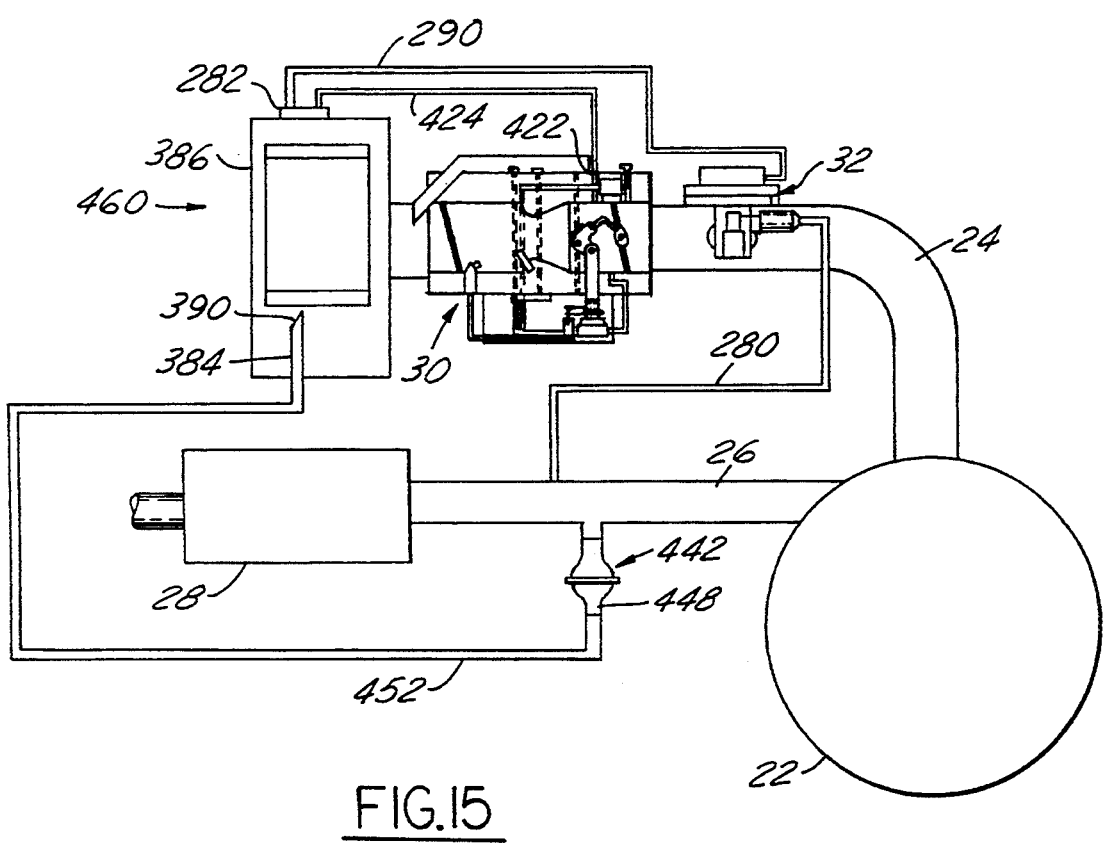
FIG. 15 is a semi-schematic side view of a third modification of a fuel metering and exhaust gas emissions system embodying this invention.

FIG. 15 illustrates a modified system 460 for relatively large displacement multiple cylinder engines which utilize the fresh air pulse valve 442 of FIG. 14 and the ported vacuum control arrangement of the system of FIG. 11 for the EGR valve. The pulse air valve 442 is connected between the air cleaner 386 and exhaust gas manifold 26 and operates in the same manner as it does in the system 440 of FIG. 13. The EGR valve 32 is actuated by the vacuum produced at the tap 422 in the mixing passage 38 adjacent and upstream of the closed throttle 40 and operates in the same manner as in the carburetor and system of FIG. 11.

This provides a simpler system with fewer parts which is relatively economical to manufacture and assemble and easy to service and maintain for relatively large displacement multiple cylinder engines.

I claim:

1. For an internal combustion small engine having at least one and not more than four cylinders, an intake manifold and an exhaust manifold, a fuel and exhaust system comprising, a carburetor having a body, a fuel and air mixing passage through said body constructed to deliver a fuel and air mixture to the intake manifold, a throttle valve carried by the body and received in said mixing passage and movable to open and closed positions therein, a main system having an air inlet and discharging emulsified fuel and air into the mixing passage upstream of said throttle valve, an idle system having an air inlet and discharging emulsified fuel and air into said mixing passage adjacent said throttle valve, a fuel well connected with both said idle system and said main system for supplying liquid fuel thereto, and a metering valve constructed and mechanically operably connected with said throttle valve to vary the rate of flow of liquid fuel to said fuel well and both said main and idle systems in response to opening of said throttle valve so that liquid fuel flows to said fuel well at a higher rate when said throttle valve is substantially fully open than when said throttle valve is substantially closed, an exhaust gas recirculation device having a housing, a flow passage in said housing for communicating with said exhaust manifold and said intake manifold downstream from said throttle valve of said carburetor for supplying exhaust gas to said intake manifold, a control valve disposed in said flow passage in said housing and movable to open and closed positions to control the flow of exhaust gas through said flow passage in said housing, a vacuum responsive actuator mechanically operably connected with said flow valve for opening and closing said flow valve, and said actuator being plumbed with at least one port opening into said fuel and air mixing passage of said carburetor upstream of said throttle valve and constructed to open said flow valve for recirculation of exhaust gas when said throttle valve is open substantially and the engine is operating under load in direct response to vacuum conditions at said at least one port, and said fuel and exhaust system does not have any exhaust gas electronic sensors and electronic controls responsive to varying engine operating conditions.

2. The system of claim 1 wherein said carburetor also comprises an accelerator pump constructed and arranged to discharge into said mixing passage a quantity of fuel in response to opening of said throttle valve from its substantially closed position.

3. The system of claim 2 wherein said carburetor also comprises a choke valve in said mixing passage upstream of the discharge of emulsified fuel into said mixing passage by said main system and movable to open and closed positions.

4. The system of claim 3 wherein said accelerator pump discharges fuel into said mixing passage at a point which when said choke valve is closed is downstream thereof.

5. The system of claim 1 wherein said metering valve of said carburetor comprises an orifice and a metering rod having a tip which cooperates with said orifice in response to movement of said rod relative to said orifice to vary and control the rate of flow of liquid fuel through said valve.

6. The system of claim 2 wherein said accelerator pump also comprises a diaphragm and a yieldably biased lost motion coupling operably connecting said disphragm with said throttle valve for moving said diaphragm to discharge fuel into said mixing passage in response to movement of said throttle valve toward its fully opened position from its substantially closed position.

7. The system of claim 6 wherein said carburetor also comprises a lost motion coupling operably connecting said metering valve with said throttle valve to vary the rate of flow of liquid fuel to said fuel well in response to opening and closing of said throttle valve.

8. The system of claim 1 wherein said carburetor also comprises a yieldably biased lost motion coupling operably connecting said metering valve with said throttle valve to vary the rate of flow of liquid fuel to said fuel well in response to opening and closing of said throttle valve.

9. The system of claim 5 wherein said carburetor also comprises an accelerator pump having a diaphragm and a yieldably biased lost motion coupling operably connecting said diaphragm with said throttle valve for moving said diaphragm to discharge fuel into said mixing passage in response to opening of said throttle valve from its substantially closed position.

10. The system of claim 1 which also comprises a thermally actuated cutoff valve connected between said port in said mixing passage of said carburetor and said vacuum responsive actuator, and constructed to open when the engine is warm and to close when the engine is cold to thereby inhibit opening of the exhaust gas recirculation control valve when the engine is cold.

11. The system of claim 1 which also comprises said mixing passage of said carburetor having a vennturi with a restricted throat therein upstream of said throttle valve and a port in said throat of said venturi of said mixing passage and plumbed with said vacuum actuator to cooperate with said port upstream of said throttle valve in operating said exhaust gas recirculation control valve.

12. The system of claim 5 which also comprises said mixing passage of said carburetor having a venturi with a restricted throat therein upstream of said throttle valve and a port in said throat of said venturi of said mixing passage and plumbed with said vacuum actuator to cooperate with said port upstream of said throttle valve in operating said exhaust gas recirculation control valve.

13. The system of claim 9 which also comprises said mixing passage of said carburetor having a venturi with a restricted throat therein upstream of said throttle valve and a port in said throat of said venturi of said mixing passage and plumbed with said vacuum actuator to cooperate with said port upstream of said throttle valve in operating said exhaust gas recirculation control valve.

14. The system of claim 13 which also comprises a one-way flow valve communicating with said port upstream of said throttle valve and plumbed downstream of said port in said throat of said venturi to cooperate with said pair of ports and increase ported vacuum signals acting on said vacuum responsive actuator therefrom in small single and twin cylinder engines.

15. The system of claim 14 which also comprises a flow restrictor communicating with said port in said throat of said venturi to cooperate with said port to reduce vacuum bleed-off effects on ported signals received from said port upstream of said throttle valve in operating said exhaust gas recirculation control valve.

16. The system of claim 1 which also comprises a pulse air valve device having a body, an air passage in said last mentioned body for communicating with said exhaust manifold at a first end and a fresh air source at a second end for supplying fresh air into said exhaust manifold, and a pulse air valve disposed in said air passage and movable to open and closed positions to control the flow of fresh air to provide one-way flow into said exhaust manifold, said pulse air valve movable to an open position in response to a negative pressure pulse in said exhaust manifold which operably opens said pulse air valve and draws fresh air therein and movable to a closed position in response to a positive pressure pulse in said exhaust manifold which operably closes said pulse air valve to prevent exhaust flow from exiting therethrough.

17. The system of claim 16 which also comprises said mixing passage of said carburetor having a venturi with a restricted throat therein upstream of said throttle valve and a port in said mixing passage of said carburetor downstream of said venturi for supplying a vacuum plumbed with said pulse air valve and operable to open said pulse air valve for introduction of fresh air into said exhaust manifold when said throttle valve is opened substantially and the engine is operating under load.

18. The system of claim 17 wherein said port is plumbed to communicate with said mixing passage substantially adjacent and downstream of said throttle valve of said carburetor while in a closed position.

19. The system of claim 17 wherein said port is plumbed with said mixing passage upstream of said throttle valve of said carburetor while in a closed position.

20. The system of claim 17 wherein said pulse air valve further comprises a spring seated diaphragm operably moved to open and closed positions by a vacuum supplied from said port.

21. The system of claim 17 wherein said fresh air source further comprises a fresh air supply tube plumbed at a first end with said pulse air valve and at a second end within an air filter canister for supplying filtered air to said carburetor so as to draw fresh air from said canister into said pulse air valve in a manner which muffles transmission of exhaust gas system noise and pulse air valve noise through said tube.

22. The system of claim 21 wherein said second end of said fresh air supply tube further comprises an air inlet end constructed and arranged in a flow of air through said canister in a manner tending to force flowing fresh air into the end of said tube so as to force the air through said tube into said air passage of said air valve device.

23. The system of claim 1 wherein said idle system further comprises an emulsion jet orifice plumbed in serial flow at a first end with at least one progression port communicating with said mixing passage adjacent said throttle valve and plumbed with said fuel well at a second end, and having nozzle cross holes communicating in serial flow with an idle air bleed providing air therethrough to emulsify fuel with air passing through an emulsion jet therein to emulsify the fuel and deliver the fuel to said progression ports into said carburetor.

24. The system of claim 1 wherein said main system comprises a main fuel nozzle plumbed with a first end disposed within said mixing passage substantially adjacent a restricted throat of a venturi within said passage and plumbed at a second end with said fuel well, and having a plurality of nozzle cross holes disposed therein for supplying air from a main air bleed to emulsify the fuel with air passing through the nozzle to deliver emulsified fuel and air into said mixing passage of said carburetor.

25. For an internal combustion small engine having at least one and not more than four cylinders, an intake manifold and an exhaust manifold, a fuel and exhaust system comprising, a carburetor having a body, a fuel and air mixing passage through said body constructed to deliver a fuel and air mixture to the intake manifold, a throttle valve carried by the body and received in said mixing passage and movable to open and closed positions therein, a main system having an air inlet and discharging emulsified fuel and air into the mixing passage upstream of said throttle valve, an idle system having an air inlet and discharging emulsified fuel and air into said mixing passage adjacent said throttle valve, a fuel well connected with both said idle system and said main system for supplying liquid fuel thereto, and a metering valve constructed and mechanically operably connected with said throttle valve to vary the rate of flow of liquid fuel to said fuel well and both said main and idle fuel systems in response to opening of said throttle valve so that liquid fuel flows to said fuel well at a higher rate when said throttle valve is substantially fully open than when said throttle valve is substantially closed, an exhaust gas recirculation device having a housing, a flow passage in said housing for communicating with said exhaust manifold and said intake manifold downstream from said throttle valve of said carburetor for supplying exhaust gas to said intake manifold, a control valve disposed in said flow passage and movable to open and closed positions to control the flow of exhaust gas through said flow passage, a vacuum responsive actuator mechanically operably connected with said control valve for opening and closing said control valve, said actuator being plumbed with at least one port opening into said mixing passage of said carburetor upstream of said throttle valve and constructed to open said control valve for recirculation of exhaust gas when said throttle valve is open substantially and the engine is operating under load in direct response to vacuum conditions at said at least one port, a pulse air valve device having a body, an air passage in said last mentioned body for communicating with said exhaust manifold at a first end and a fresh air source at a second end for supplying fresh air into said exhaust manifold, and a pulse air valve disposed in said air passage and movable to open and closed positions to control the flow of fresh air to provide one-way flow into said exhaust manifold, said pulse air valve movable to an open position in response to a negative pressure pulse in said exhaust manifold which operably opens said pulse air valve and draws fresh air therein and movable to a closed position in response to a positive pressure pulse in said exhaust manifold which operably closes said pulse air valve to prevent exhaust flow from exiting therethrough and said fuel and exhaust system does not have any exhaust gas electronic sensors and electronic controls responsive to varying engine operating conditions.

* * * * *